United States Patent [19]
Franke et al.

[11] Patent Number: 4,786,020
[45] Date of Patent: Nov. 22, 1988

[54] SYSTEM FOR BOUNDARY LAYER CONTROL THROUGH PULSED HEATING OF A STRIP HEATER

[75] Inventors: Milton E. Franke, Dayton, Ohio; Lawrence Kudelka, Fruit Heights, Utah

[73] Assignee: The United States of America as represented by the Secretary of the Air Force, Washington, D.C.

[21] Appl. No.: 149,814

[22] Filed: Jan. 29, 1988

[51] Int. Cl.$^4$ .............................................. B64C 21/00
[52] U.S. Cl. ...................................... 244/204; 244/130
[58] Field of Search ................... 244/130, 134 D, 198, 244/200, 204, 205

[56] References Cited

U.S. PATENT DOCUMENTS 3,362,663  1/1968  Wehrmann ......................... 244/130
4,516,747  5/1985  Lurz .................................... 244/204

FOREIGN PATENT DOCUMENTS 1031925  6/1953  France ................................ 244/205
348293   5/1931  United Kingdom ................ 244/204

Primary Examiner—Galen L. Barefoot
Assistant Examiner—Rodney Corl
Attorney, Agent, or Firm—Bobby D. Scearce; Donald J. Singer

[57] ABSTRACT

A system is described for controlling the transition of laminar/turbulent flow at a surface which comprises a thin narrow strip heater disposed adjacent the surface and extending substantially transversely of the flow of the air stream thereacross, the heater being resiliently held in tension on or in closely spaced relationship to the surface, and a power source operatively connected to the heater for applying pulsed voltage of preselected amplitude and frequency to the heater.

4 Claims, 1 Drawing Sheet

SYSTEM FOR BOUNDARY LAYER CONTROL THROUGH PULSED HEATING OF A STRIP HEATER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to systems and methods for controlling laminar/turbulent flow at a surface and more particularly to system and method for selectively promoting or retarding the laminar/turbulent transition by controlled surface heating.

In a laminar boundary layer on a substantially flat plate, periodic disturbances known as Tollmien-Schlichting waves can develop prior to transition to a turbulent boundary layer. A laminar boundary layer on a surface is considered stable if the disturbances decrease in amplitude as they move downstream along the surface and unstable if the disturbances increase in amplitude. If the disturbances increase in amplitude, a transition to a turbulent boundary layer eventually results.

Experiments by Schubauer and Skramstad (J Aero Sci 14:69-78 (February 1947)) showed that mechanical oscillations of thin ribbons near a surface generate disturbances and influence the transition from laminar to turbulent flow. More recently, Thomas (J Fluid Mech 137:233-250 (1983)) used vibrating ribbons to control or delay boundary layer transition.

Liepmann et al reported (J Fluid Mech 118:187-200,201-204 (1982)) that periodic heating of heater strips could be used to excite laminar instability waves in water and to control, cancel or reduce instability wave amplitudes. By reducing the amplitude of instability waves, transition from laminar to turbulent flow is delayed. Maestrello (AIAA Shear Flow Control Conf. Paper 85-0564 (March 1985)) showed experimentally that surface heating of a boundary layer led to growth of disturbances.

In the prior art teachings, the laminar/turbulent transition is affected by utilizing ribbons spaced away from the surface over which the flow is maintained, and by inducing vibrations in the ribbon mechanically or electromagnetically. Such arrangements suffer from certain shortcomings, particularly in practical application, since mechanical or electromagnetic means are required adjacent the ribbon to provide the required vibration, and mounting the ribbon in spaced relationship to the surface severely disturbs flow along the boundary surface and subjects the ribbon and vibrating means to damaging effects of the flow when not in use.

The present invention solves or reduces in critical importance problems of the prior art as just suggested by controlling (promoting or retarding) the laminar/turbulent transition at a surface using a heated ribbon (or other appropriate strip heater) which is controllably vibrated by pulsed heating to excite vibration in the ribbon, which in turn leads to sinusoidal disturbances in the boundary layer along the surface. Ribbon vibration amplitude and frequency are controlled by selective pulse heating and suitable selection of ribbon attachment geometry. In the practice of the invention, the ribbon is mounted on or in closely spaced relationship to the surface or is flush mounted (recessed) in a groove provided in the surface over which the flow is to be controlled. Inducing vibrations using pulsed heating according to the invention avoids the need for mechanical or electromagnetic vibrating means which necessarily interfere with flow at the boundary surface. Flush mounting is especially desirable as presenting a configuration least susceptible to equipment damage and to interference with boundary layer flow.

The invention has substantial practical utility in the control of boundary layer transition at lifting surfaces on flight vehicles to control stall, to increase lift, to reduce lift loss at high angles of attack, to reduce drag, to counteract pressure oscillations in cavities such as aircraft bays at high subsonic and supersonic Mach numbers, and to improve fuel efficiency. Pulsed heating according to the invention can be selectively applied or removed rapidly. Minimal interference with normal operation of airfoils, lifting surfaces, and the like is realized through use of the invention herein.

It is therefore a principal object of the invention to provide system and method for controlling the laminar/turbulent transition of flow at a surface.

It is a further object of the invention to provide system and method for controllably heating a surface in the control of laminar/turbulent flow at the surface.

These and other objects of the invention will become apparent as the detailed description of representative embodiments proceeds.

SUMMARY OF THE INVENTION

In accordance with the foregoing principles and objects of the invention, a system is described for controlling the transition of laminar/turbulent flow at a surface which comprises a thin narrow strip heater disposed adjacent the surface and extending substantially transversely of the flow of the air stream thereacross, the heater being resiliently held in tension on or in closely spaced relationship to the surface, and a power source operatively connected to the heater for applying pulsed voltage of preselected amplitude and frequency to the heater.

DESCRIPTION OF THE DRAWINGS

The invention will be clearly understood from the following detailed description of representative embodiments thereof read in conjunction with the accompanying drawings wherein.

DETAILED DESCRIPTION

Substantial background information and theoretical discussions related to disturbances in laminar flow and temperature responses of pulse heated thin metallic ribbons according to the invention are given in "Boundary Layer Disturbances Caused by Periodic Heating of a Thin Ribbon", a thesis by Lawrence Kudelka (Milton E. Franke, Advisor), Document AFIT/GA-E/AA/86D-7, Air Force Institute of Technology, Wright-Patterson AFB, OH (1986), which background information and theoretical discussions are incorporated herein by reference.

Figure 1:
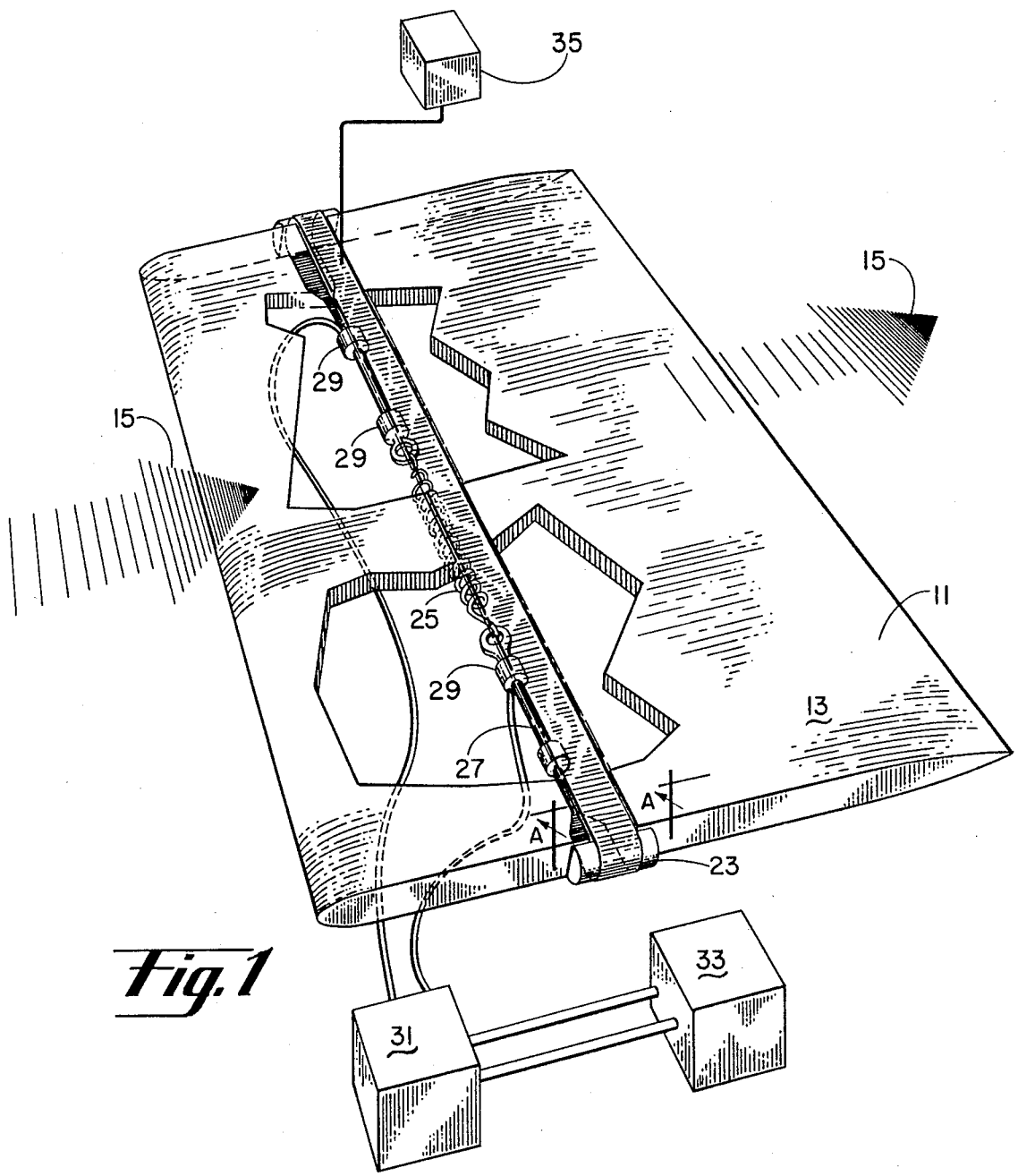
FIG. 1 is a schematic perspective view of a system configured for characterizing and controlling the laminar/turbulent transition of flow at a surface according to the invention, a portion of the surface of the system shown broken away to reveal system components connected on the underside thereof.
Figure 2:
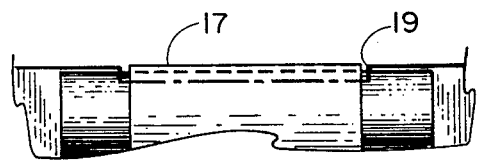
FIG. 2 is an enlarged partial edge view along line A—A of FIG. 1.

Referring now to FIG. 1 of the drawings, shown therein is a schematic perspective view of a representative system according to the invention. FIG. 2 is an enlarged edge view along line A—A of FIG. 1. FIG. 1 is shown partially broken away to reveal system components connected on the underside of the system.

In FIG. 1 is illustrated a plate 11 defining a surface 13 across which the laminar/turbulent transition of airflow 15 is to be controlled. Plate 11 is representative in practical application of an aerodynamic lifting surface or control element. A thin metallic ribbon 17 was mounted on surface 13 of plate 11 substantially transverse of the flow direction of airflow 15 as suggested in FIG. 1, and provided a thin region on and across surface 13 for controlled pulsed heating according to the invention in the control of the laminar/turbulent transition of airflow 15. It is noted that strip heaters of suitable configuration may be used in place of ribbon 17 of the demonstration system and may be mounted at or in closely spaced relationship (i.e., a few thousandths of an inch) to surface 13 as would occur to one with skill in the field of the invention guided by these teachings. Groove 19 of appropriate size may be provided in surface 13 for receiving ribbon 17 and providing flush mounting with respect to surface 13, this configuration being illustrated in FIG. 2. In the system shown in the figures and built and operated in demonstration of the invention, ribbon 17 comprised thin nichrome ribbon 1/16 inch wide by 0.002 inch thick having a resistance of about 8 ohms per foot at room temperature.

In order to selectively excite ribbon 17 (or other appropriate heater) to vibration in accordance with the teachings of the invention, ribbon 17 is resiliently tensioned along its length by suitable tensioning means across surface 13 to take up slack caused by alternate expansion and contraction along its length during pulsed heating. Changes in length of ribbon 17 during pulsed heating was accommodated in the demonstration system by extending ribbon 17 around the edges of plate 11 across 1/32 inch OD steel tubing segments 23 which provided substantially frictionless edges for ribbon 17 to slide on. Corresponding ends of ribbon 17 were connected at the underside of plate 11 using axially resilient spring 25, insulator rod 27 and suitable electrical connectors 29. Power amplifier 31 (Bosen Model 60B in the demonstration system) was electrically connected between respective ends of ribbon 17 substantially as shown in FIG. 1. Connectors 29 included means to adjust the effective length of ribbon 17 and the tension of spring 25 was adjustable so that the vibration frequency and amplitude of ribbon 17 during pulsed heating may be selected. Voltage pulses at suitable frequency were generated by function generator 33. Amplifier 31 provided amplification of the signal from generator 33 to a power level sufficient to heat ribbon 17 by ohmic heating. Spring 25 provided resilient means to take up slack which occurs when ribbon 17 expands upon being heated, and to maintain substantially uniform tension as ribbon 17 decreases in length upon cooling.

In the operation of the demonstration system, voltages pulses applied by generator 33 to ribbon 17 causes small fluctuations in the length of the ribbon. The shape and frequency of the voltage pulses applied to ribbon 17 is not considered limiting of the invention herein so long as sufficient heat is applied to and removed from ribbon quickly to cause suitably rapid expansion and contraction and the desired vibrational frequency and amplitude. Square wave, sinusoidal or other pulse shape may therefore be used in accordance with these teachings. Because ribbon 17 is held under tension by spring 25, ribbon 17 vibrates and causes disturbances in the laminar boundary layer of airflow 15 across surface 13. In order to characterize these disturbances as functions of applied electrical pulse and ribbon tension and placement, a hot wire anemometer 35 was placed near ribbon 17 in the demonstration system. The disturbances appear as sinusoidal velocity fluctuations propagated along and across the boundary layer, as discussed more completely in the Kudelka and Franke reference, supra.

Tests in demonstration of the invention were conducted on a nichrome ribbon 17 flush mounted on a plate 11 comprising a piece of fiber-reinforced phenolic resin board 8 inches wide by 12 inches long by 3/16 inch thick on an aluminum support in a nine-inch low speed wind tunnel having a 36 inch long test section capable of a stream velocity of about 67 ft/sec. The wind tunnel had sufficiently low free turbulence (less than 1%) to permit the detection of velocity perturbations in the boundary layer caused by periodic heating of the ribbon.

Velocity and turbulence in the boundary layer were measured with a hot wire anemometer 35 (Thermal Systems Inc (TSI) series 1050 connected to a TSI 1218-20 hot film boundary layer probe sensor having an operating temperature to about 250° C.); the output of anemometer 35 was passed through a linearizing module, a signal conditioner with a 500 Hz low-pass filter, a digital voltmeter (Hewlett-Packard) and a storage oscilloscope to a microcomputer with an analog-to-digital converter. The computed mean and standard deviation voltages corresponded closely with the digital voltmeter DC and RMS voltages, respectively (within 1%). The storage oscilloscope displayed the voltage applied to the ribbon and anemometer 35 output (velocity fluctuation). The DC voltage corresponded to the mean flow velocity and the RMS voltage to velocity fluctuations (turbulence).

A hot-film probe measured the sinusoidal disturbances induced in the boundary layer by pulsed periodic heating of ribbon 17. Vibration of ribbon 17 while mounted on plate 11 was observed and measured using a microscope having a calibrated reticle. A strobe light was used to illuminate ribbon 17 for displacement measurements during pulsed heating. The amplitudes ranged from 0.001 to 0.005 inch, the higher amplitudes indicating resonant modes of ribbon 17 pulsed under tension. At the largest amplitude the periodic heating was set at approximately 180 or 370 Hz. Other frequencies also excited this particular ribbon, but at lower amplitudes. Response of the ribbon was not significantly affected by spring tension.

The tests run using the demonstration system configured as described above showed that ribbon 17 can be vibrated at selected frequencies by periodic heating to control the growth or decay of disturbances or to cancel disturbances by amplitude and phase shifting of the disturbances induced by vibration. Any number of ribbons can be used on plate 11 spaced at various locations along, and independent of the curvature of surface 13.

The invention therefore provides system and method for promoting or retarding the laminar/turbulent transition of flow at a boundary surface. It is understood that modifications to the invention as described may be made by one skilled in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A system for controlling the transition between laminar and turbulent flow of an air stream across a surface, comprising:

(a) a thin narrow strip heater disposed adjacent said surface and extending substantially transversely of the flow of said air stream across said surface;

(b) means for resiliently tensioning said heater along the length of said heater; and (c) electrical means operatively connected to the ends of said heater for applying pulsed voltage of preselected amplitude and frequency to said heater.

2. The system as recited in claim 1 wherein said heater comprises a thin metallic strip of preselected length having first and second ends, said thin metallic strip being resiliently tensioned along its length substantially flush against said surface.

3. The system as recited in claim 1 further comprising means for holding said heater in preselected spaced relationship to said surface.

4. The system as recited in claim 3 wherein said heater comprises a thin metallic strip.

* * * * *